Feb. 6, 1940.  S. A. HUEBNER  2,188,948
SERVICE SIGNAL EQUIPMENT
Filed Oct. 2, 1936

Inventor
Samuel A. Huebner
By Wheeler, Wheeler + Wheeler
Attorneys

Patented Feb. 6, 1940

2,188,948

UNITED STATES PATENT OFFICE 2,188,948

SERVICE SIGNAL EQUIPMENT

Samuel A. Huebner, Forest Junction, Wis.

Application October 2, 1936, Serial No. 103,689

5 Claims. (Cl. 200—82)

My invention relates to improvements in service signal equipment.

Signalling systems have heretofore been provided for installation in the runways adjacent service pumps in gasoline filling stations, but the impulse used to initiate the signalling operation which is usually given by a vehicle or other heavy object pressing upon a treadle in the runway may be delicate, as when a motorcycle passes over the treadle, or it may be excessively vigorous as when a heavy truck with dual wheel is brought to a standstill with the entire weight of the dual wheels upon the treadle, or when any heavy weight is "parked" thereon.

My improved signalling system and a control therefor is intended to meet the diverse conditions above referred to and to supply a control device for a signalling system for the purpose of insuring a signal of set duration for a light or heavy vehicle and yet a signal which will shut off automatically after it has endured for a predetermined length of time, whether the wheel drives over or continues to park on the treadle.

The object of my invention is to provide a service signal with means whereby the duration of actuation of the signalling device is limited.

Another object of my invention is to provide means in a signalling system whereby the duration of energization of the signalling device is substantially the same despite variations in the strength of the impulse which initiates the signalling action. Also if a vehicle continues to park on the treadle, and circuit has already opened, the circuit can be again closed if a vehicle compresses any other treadle attached to the same circuit closer.

In the drawing.

Like parts are designated by the same reference characters throughout the several views.

Figure 1:
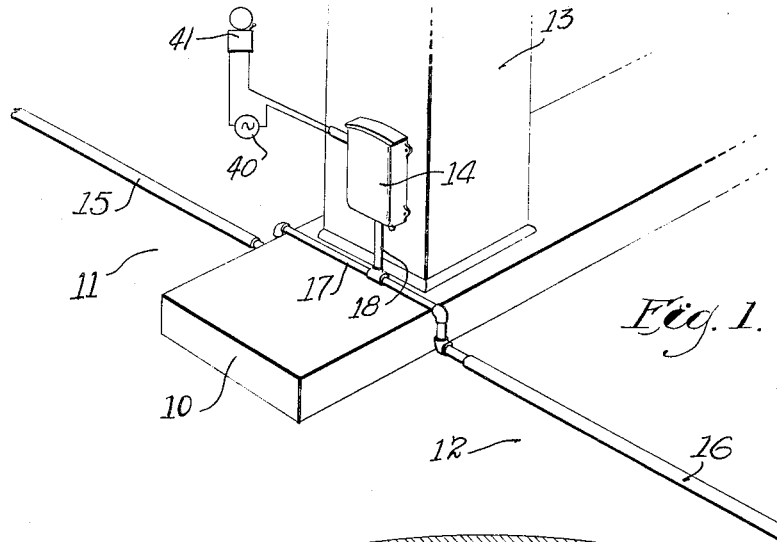
Figure 1 is a perspective of a typical filling station with two aisleways and a raised platform therebetween, showing the lower portion of a filling station pump based upon the raised platform, showing my signal box and treadles installed in said aisleways and on said pump and showing diagrammatically an electric circuit and a signalling device.

A typical filling station includes a raised platform 10 between two aisleways 11 and 12. Automobiles, motorcycles and other vehicles to be serviced in the filling station enter the filling station over the aisleways 11 or 12. Upon the raised platform 10 a pump structure 13 provides a convenient mounting for my control box 14 in which the moving parts of the control switch for my signalling system are installed. Across each of the aisleways 11 and 12 I provide collapsible treadle strips 15 and 16 connected by piping 17 and a standpipe 18 with the control box 14. The standpipe 18 is directly connected within the box 14 with the lower portion of a cylinder 19. I fill the treadle strips 15 and 16 and the piping 17 and 18 with a fluid which may surge in the strips and piping when the strips 15 and 16 are compressed by heavy objects such as automobile or truck tires and wheels.

Control switch

Within the box 14 I provide an electric switch mechanism, mounted upon a horizontal partition 20, which includes two spaced spring contacts 21 and 22, each connected to a separate electric conductor wire 210 and 220, respectively. When my signalling device is in its normal non-signalling position, the moving parts are at rest with a band of insulation 23 surrounding a piston rod 24 separating the spring contacts 21 and 22, whereby to maintain in open condition the circuit including the electric conductors 210 and 220. The piston rod 24 upon which the insulating ring 23 is secured is mounted with a piston head 25, and the piston head and piston rod are urged to their lowermost position by a spring 26.

When fluid in the piping and treadles surges under the weight of a vehicle wheel upon the strips 15—16, the fluid is urged through a conduit 27 past a ball check 28 into the bottom of the cylinder 19 where its pressure upon the under side of the piston head 25 causes the piston rod 24 to be thrust upwardly, thereby carrying with the piston rod a conductor sleeve 29 which may slide between the upper ends of the spring contacts 21 and 22 and complete the circuit which includes the conductor wires 210 and 220. If the pressure upon the treadle strips 15—16 continues, the plunger 24 does not maintain its upwardly thrust position, but under the influence of the spring 26 slowly descends as fluid is pressed out of the cylinder 19 through conduit 30 and through an adjustable needle valve 31. A "needle" 32 therefor forms part of a long rod 33, which is slotted at the top to provide for easy manipulation by means of a screw driver.

If the needle valve is opened widely, the release of the fluid from the cylinder 19 is rapid and the descent of the rod 24 and the insulating ring 23 to a point where the signal circuit is again broken will be rapid, whereas if the needle valve at 31 is opened slightly, the descent of the rod 24 will be slow and the circuit will remain complete for a greater duration. In the meantime, of course, the ball check 28 prevents escape of fluid into the pipe 18.

With the structure thus far described, the duration of signal energization in the electric circuit will be different for each type of automobile, motorcycle or truck which passes over the strips 15—16 for, naturally, a greater area of the strips will be compressed when a vehicle with large tires compresses the strip and the piston rod 24 will be displaced little or more according to the area and extent of compression of the strip.

I therefore provide in the side wall of the piston 19 at a short distance above the conduit 30, an enlarged port 300 so that no matter what displacement there may be initially of the piston head 25, there will be release of fluid through the port 300 and rapid return of the plunger 25 to a position just below the margins of the port 300. The continued downward movement will thereafter be regulated by the size of the opening in the needle valve at 31.

Figure 2:
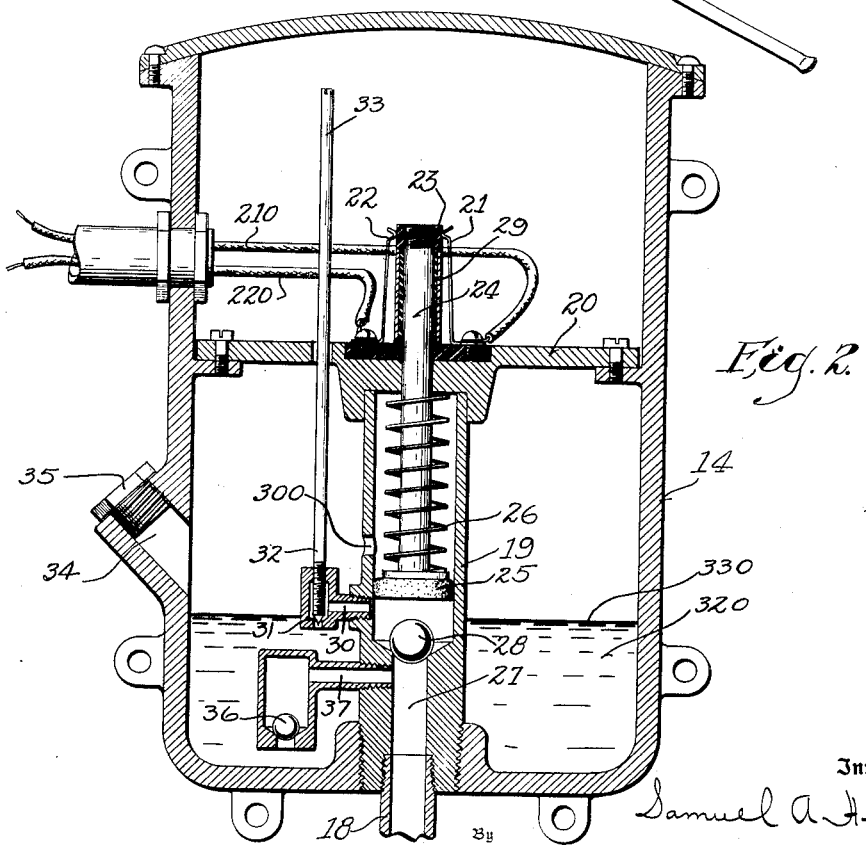
Figure 2 is a vertical section through the control box shown in Fig. 1.

A supply of fluid 320 in the box 14 is maintained at the level indicated by the line 330 in Fig. 2, and a filler opening 34 closed by a plug 35 is provided for ready addition of more fluid in case of leakage. The quantity of fluid 32 in the box 14 constitutes a reservoir and fluid may be fed through a supply ball check 36 and through a feed pipe 37, which is in communication with the conduit 27 below the ball check 28. Ball check 36 prevents fluid from passing to the reservoir when the strips are compressed. The strips 15—16 are therefore refilled with fluid immediately upon the removal of the weight therefrom even though the piston 25 has not yet returned to its lowermost position, it being understood that the strips have a natural resilience tending to maintain them in distended condition and induct the fluid from the reservoir.

The electric circuit including the wires 210—220 includes also a source of electric current 40 and when the circuit is completed through the conductor sleeve 29, any form of signalling device may be operated thereby.

In Fig. 1, I have shown the circuit completed through an electric bell 41, but a light signal or any other form of signal to be energized or initiated by the current flowing in the circuit 210—220 may be controlled by the switch in the box 14 above described.

From the above description it will be seen that I have provided a control device whereby differences in quantity of fluid surging in the pipes 17—18 cannot materially influence the duration of the signal controlled by such switch, and even though an excessive surge of fluid into the cylinder 19 is caused by a heavy weight upon a tremendous area of the strip 15 or 16, the piston 25 will rapidly return to a point just below the port 300 and the current will continue to flow in the signal circuit only long enough to permit the escape of fluid from the needle valve 31 at the speed dictated by the setting of that needle valve.

I therefore provide for an adjustable means whereby very light pressure as a bicycle or other light pressure will not set the signal in operation because the small surge of fluid will escape at the adjustable by-pass valve 31 before the plunger has been sufficiently displaced upwardly to close the electrical circuit. By increasing or decreasing the opening of the adjustable by-pass, the amount of fluid required to close the circuit which is the amount of pressure or volume displacement required on the strips 15 or 16 to set the signal system in operation, can thus be controlled.

I claim:

1. In a control device operable by means of large or moderate surges of fluid, a receptacle to receive and temporarily hold the surge of fluid, a controlled device operable when the receptacle receives and holds the surge of fluid, a large port to relieve excess quantities of fluid from the receptacle, and a bleed valve for escapement of a predetermined basic quantity of fluid from the receptacle whereby a maximum and minimum predetermined duration of operation of the controlled device is established.

2. A controller including a compressible fluid containing member provided with fluid adapted to be expressed from said member in large or small quantities, a cylinder in fluid connection with said member whereby to receive fluid therefrom when the member is compressed, a piston in said cylinder connected with a device to be controlled whereby to energize the device when fluid is expressed from the member into the cylinder, a large relief port in the cylinder to relieve fluid therefrom until a predetermined minimum amount remains in the cylinder, and a small bleed valve for releasing said predetermined minimum from the cylinder before permitting the piston to return the piston to a position for de-energization of the controlled device.

3. A controller including a compressible fluid containing member, a cylinder in fluid connection with said member whereby to receive fluid therefrom when the member is compressed, a piston in said cylinder connected with a controlled device whereby to energize the device when fluid is expressed from the member into the cylinder whereby to displace the piston, a spring to return the piston to a position in which the device is de-energized, a relatively large port for relief of fluid from the cylinder when the piston is displaced more than a predetermined distance and an adjustable bleed valve whereby to relieved fluid pressure from the piston when said port is closed.

4. A switch controller including a compressible fluid containing member, a cylinder in fluid connection with said member whereby to receive fluid therefrom when the member is compressed, a piston in said cylinder provided with an inlet and a piston rod, a dielectric sheath for one portion of said rod, and an electrically conductive sheath for another portion of said rod, and spaced contact elements resiliently opposed to each other and separated normally by said dielectric sheath, said contact elements being adapted to form a part of an electric circuit and comprising with said sheaths a switch closable when a surge of fluid is expressed from said member into the cylinder.

5. A switch controller, a compressible fluid containing member, a cylinder and fluid connection with said member whereby to receive fluid therefrom when the member is compressed, a piston in said cylinder provided with a piston rod, a dielectric sheath for one portion of said rod, and an electrically conductive sheath for another portion of said rod, electrical contacts resiliently positioned to be separated by said sheaths, said cylinder being provided near its inlet with a bleed passage and provided at a point spaced from said inlet with a port adapted to be uncovered by the piston in its travel away from said inlet.

SAMUEL A. HUEBNER.